US008046490B1

(12) United States Patent
Wu (10) Patent No.: US 8,046,490 B1
(45) Date of Patent: Oct. 25, 2011

(54) SYSTEM AND METHOD FOR ENHANCING NETWORK SECURITY

(75) Inventor: Yuguang Wu, Santa Clara, CA (US)

(73) Assignee: Google Inc., Mountain View, CA (US)

(*) Notice: Subject to any disclaimer, the term of this patent is extended or adjusted under 35 U.S.C. 154(b) by 182 days.

(21) Appl. No.: 12/402,842

(22) Filed: Mar. 12, 2009

(51) Int. Cl.
*G06F 15/173* (2006.01)
(52) U.S. Cl. ......... 709/238; 709/224; 709/243; 370/351
(58) Field of Classification Search .................. 709/238, 709/243, 220, 224; 370/351, 389
See application file for complete search history.

(56) References Cited

U.S. PATENT DOCUMENTS

| | | | |
|---|---|---|---|
| 6,691,169 B1 * | 2/2004 | D'Souza | 709/242 |
| 7,181,533 B2 | 2/2007 | D'Souza et al. | |
| 7,373,660 B1 * | 5/2008 | Guichard et al. | 726/15 |
| 2006/0291473 A1 * | 12/2006 | Chase et al. | 370/395.5 |
| 2007/0276958 A1 * | 11/2007 | Curtis et al. | 709/238 |

OTHER PUBLICATIONS

Franklin Curt, "How Routers Work", downloaded Dec. 5, 2008, http://computer.howstuffworks.com/router1.htm, pp. 11.
Border Gateway Protocol, downloaded Mar. 12, 2009, http://en.wikipedia.org/wiki/Border_Gateway_Protocol, pp. 14.
IT Knowledge Exchange, "Verify The IP Routing Table" downloaded Oct. 15, 2008, http://searchnetworkingchannel.techtarget.com/generic/0,295582,sid, pp.
Sahara.cs.berkeley.edu/summer2003/1w.ppt, Summer 2003, pp. 6.
Securing Quality-of-Service Route Discovery in On-Demand Routing for Ad Hoc Networks, downloaded Oct. 25, 2004, hppt://www.monarch.cs.rice.edu/monarch-papers/sasn04.pdf, pp. 12.

* cited by examiner

*Primary Examiner* — Philip B Tran
(74) *Attorney, Agent, or Firm* — Lerner, David, Littenberg, Krumholz & Mentlik, LLP (57) ABSTRACT

A method of transmitting data via a network of computers comprises receiving, at a first node of the network and from a second node of the network, first suggested routing information to a destination node, where the first suggested routing information defines at least one node through which data will be transmitted to the destination node. First data is sent to the destination node via the first suggested routing information, and a processor associated with the first node determines whether the first data was received at the destination node. Further second data may be received at the first node of the network, where the second data is intended to be sent to the destination node, and the second data may be sent to the destination via the first suggested routing information depending on the determination of whether the first data was received at the destination.

19 Claims, 5 Drawing Sheets

SYSTEM AND METHOD FOR ENHANCING NETWORK SECURITY

BACKGROUND OF THE INVENTION

Many computer networks, including the Internet, may establish connections between a source and a destination through one or more routers. These routers may operate according to one of a variety of protocols, most commonly Border Gateway Protocol (BGP), Exterior Gateway Protocol (EGP), Intermediate-System to Intermediate-System (ISIS), Open Shortest Path First (OSPF), or Routing Information Protocol (RIP). BGP is the de facto routing protocol of the global Internet, connecting Autonomous Systems (AS) belonging to different administrative domains. According to BGP, routing decisions are made based on local preference, multiple exit discriminator (MED), AS path length, and other network policies or rulesets.

Usually, and in particular with BGP, the routers communicate with one another to exchange routing information. For example, a router may "advertise" a particular route to peer routers. The peer routers may receive the advertised route, and may adopt the advertised route to replace existing route information if, for example, the advertised route is shorter or the advertising router is a trusted source. In turn, these peer routers may further advertise the particular route to other routers.

Known methods of exchanging such routing information are insecure. For example, according to BGP, routes may be received and adopted without verification of their accuracy or authenticity. If an invalid route is adopted, it may result in failure to establish communication between a source and a destination. Worse, the invalid route may be advertised to peer routers and adopted by the peer routers. For networks such as the Internet, where numerous routers are involved and thousands of people may attempt to access a website at one time, such failure to establish communication can be widespread. Accordingly, a security model for use in such networks is desired.

BRIEF SUMMARY OF THE INVENTION

An aspect of the invention provides a method of transmitting data via a network of computers comprises receiving, at a first node of the network and from a second node of the network, first suggested routing information to a destination node, where the first suggested routing information defines at least one node through which data will be transmitted to the destination node. First data is sent to the destination node via the first suggested routing information, and a processor associated with the first node determines whether the first data was received at the destination node. Further second data may be received at the first node of the network, where the second data is intended to be sent to the destination node, and the second data may be sent to the destination via the first suggested routing information depending on the determination of whether the first data was received at the destination.

Another aspect of the invention provides a system of routing information. The system may include a network of nodes including a first node, and a first router in communication with a second router, a third router, and the first node. The first router may comprise a processor, instructions executable by the processor, and a memory storing preferred routing information, the preferred routing information including first routing information for transmitting data to the first node. The second router may comprise a memory storing second routing information for transmitting data to the first node. The instructions may comprise receiving, at the first router, the second routing information, transmitting a sample data packet to the first node via the second routing information, determining whether the sample data packet was received at the first node, and storing, as the preferred routing information, the second routing information depending on whether the sample packet was received at the first node.

Yet another aspect of the invention provides a controller communicable with a router for use in routing information through a network. The controller may comprise a processor, instructions executable by the processor, and a memory storing routes which are known to be valid or invalid. The instructions may comprise receiving routing information stored in a database of the router, comparing the routing information with the routes known to be valid or invalid, and deleting the routing information from the first database of the router if the routing information matches routing information known to be invalid. If the routing information does not match routing information known to be valid or invalid, it may be determined whether packets transmitted via the routing information will reach an intended destination, and, if it is determined that packets transmitted via the routing information will reach the intended destination, data may be transmitted to the router indicating that the routing information is valid.

Even further, another aspect of the invention provides a computer-readable medium executable on a computing device and storing a program to perform a method of transmitting data through a network. The method may comprise receiving, at a first node of the network and from a second node of the network, first suggested routing information to a destination node, where the first suggested routing information defines at least one node through which data will be transmitted to the destination node. First data is sent to the destination node via the first suggested routing information, and a processor associated with the first node determines whether the first data was received at the destination node. Further second data may be received at the first node of the network, where the second data is intended to be sent to the destination node, and the second data may be sent to the destination via the first suggested routing information depending on the determination of whether the first data was received at the destination.

DETAILED DESCRIPTION

An aspect of the present invention provides an apparatus and method for improving network routing. According to this aspect, a route check controller in communication with a network router may verify routing information used by the router to transmit data through the network. According to one example, the route check controller performs such verification in response to a determination by the router that a new route should be adopted. If the route check controller determines that a route is invalid, that route may be rejected or abandoned.

Figure 1:
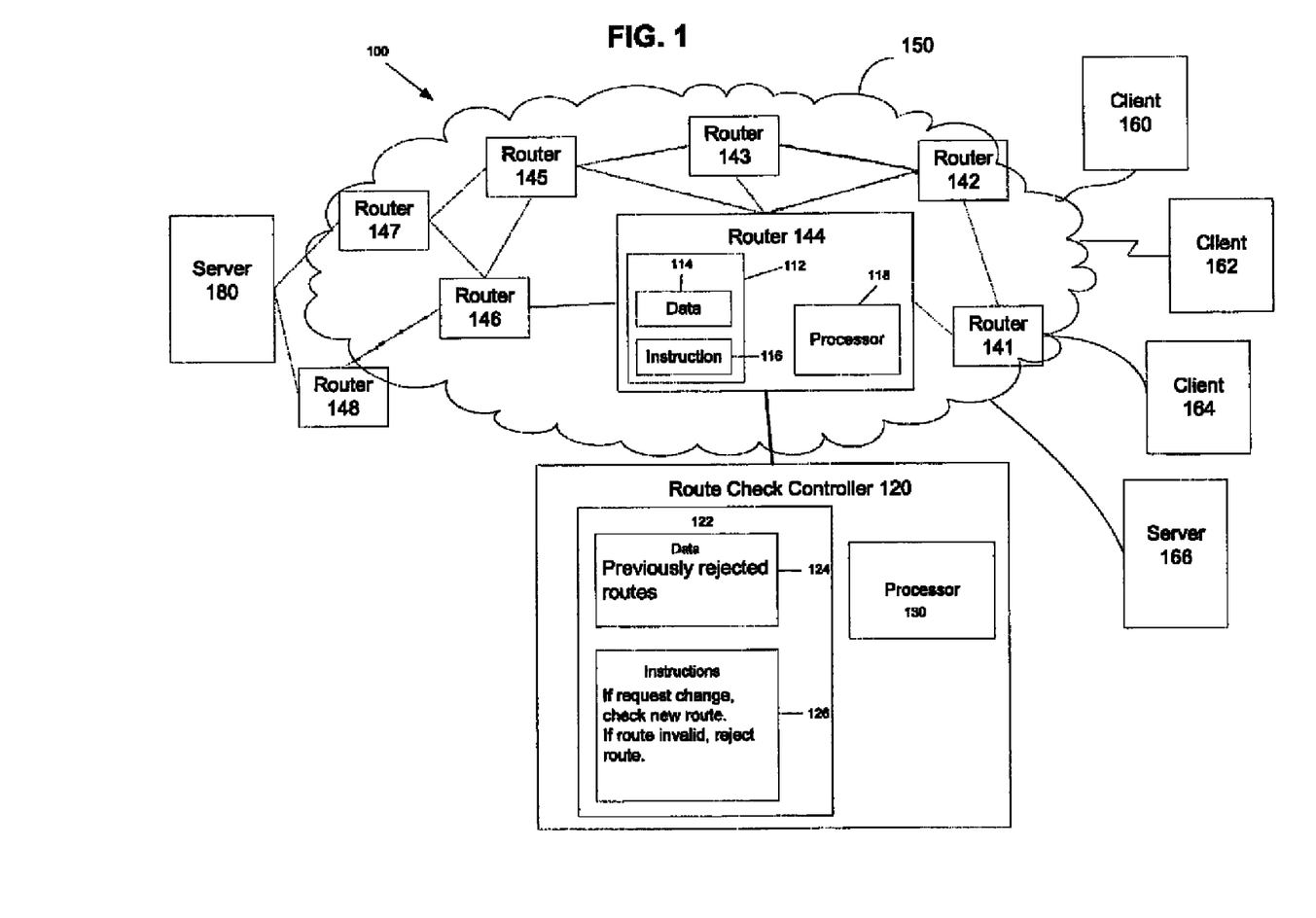
FIG. 1 is a system diagram according to an aspect of the invention.

FIG. 1 shows a system 100 in accordance with one aspect of the invention. The system 100 comprises a server 180, and end users 160-166 connected to a network 150. The network 150 includes routers 141-148. The routers 141-148 may communicate with end users 160-166 and server 180 either wirelessly or via a hard-wired connection. The routers 141-148 may similarly communicate with each other, other routers, and external systems and databases (not shown). Various types of information may be sent through routers between the end user computers 160-166 and the server 180. For example, packets of information may include requests for information from websites or other administrative domains, responses to such requests, emails, etc.

As shown, the router 144 is further electronically coupled to a route check controller 120, which may verify routing information used by or communicated between the routers 141-148. Accordingly, end users 160-166 may be routed through the network 150 to a destination, such as server 180, with the aid of the routers 141-148 and the route check controller 120.

Generally, routers may communicate with peer routers. For example, the router 144 may communicate with the routers 141-148 via communication lines, such as public telephone lines or fiber optic connection, or wireless connections.

The router 144 may comprise a processor 118 and a memory 112. Memory 112 may include data 114 and instructions 116 accessible by the processor 118 for routing packets and other information. Memory 112 may be of any type capable of storing information accessible by the processor, such as a hard-drive, ROM, RAM, CD-ROM, write-capable, read-only, or the like.

Data 114 may include one or more separate databases of information. The databases may be used, for example, for storing route information received from peer routers, for storing route information to be used for forwarding packets through a network, and/or for storing route information to be advertised to further peer routers. For example, routers used with border gateway protocol (BGP) may conceptually include a local routing information base (Loc-RIB), an adjacent routing information base, incoming (Adj-RIB-In), and an adjacent routing information base, outgoing (Adj-RIB-Out). However, while each considered a separate database, they may be structured as one or more physical databases within or external to the routers 141-148.

The router 144 may also include a set of instructions 116 for manipulating the data 114. For example, the instructions 116 may instruct the processor 118 to select particular routes to be verified, to compare the routes with routes currently in use, and/or to adopt the selected routes in place of routes currently in use.

As will be explained in further detail below, the route check controller 120 may improve the exchange of information over networks. The route check controller 120 may comprise a computer containing a processor 130 and memory 122. As shown in FIG. 1, the route check controller 120 is a separate unit communicatively coupled to the router 144. However, it should be understood that the route check controller 120 may be integral with the router 144, or may share a memory and/or processor with the router 144.

Memory 122 stores information accessible by processor 130, including instructions 126 for execution by the processor 130 and data 124 which is retrieved, manipulated or stored by the processor 130. It will be understood that memory 122 may be of any type capable of storing information accessible by the processor, such as a hard-drive, ROM, RAM, CD-ROM, write-capable, read-only, or the like.

The instructions 126 may comprise any set of instructions to be executed directly (such as machine code) or indirectly (such as scripts) by the processor. In that regard, the terms "instructions," "steps" and "programs" may be used interchangeably herein. For example, if the router 144 receives a new advertised route, and is about to replace an existing route with the advertised route, the processor 130 may be instructed to first verify the advertised route. Additionally, if the route is invalid, the processor 130 may be instructed to reject the route. The functions, methods and routines of the program in accordance with the present invention are explained in more detail below.

Data 124 may be retrieved, stored or modified by processor 130 in accordance with the instructions 126. For example, the data 124 may include previously rejected routes for comparison with advertised routes received by the router 144. In this regard, the processor may compare the advertised route with previously rejected routes to check whether the route has already been declared invalid. The data may be stored as a collection of data. For instance, although the invention is not limited by any particular data structure, the data may be stored in computer registers, in a relational database as a table having a plurality of different fields and records, as an XML. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some or all of the instructions and data may be stored on removeable CD-ROM and others within a readonly computer chip. Some or all of the instructions and data may be stored in a location physically remote from, yet still accessible by, the processor. Similarly, the processor may actually comprise a collection of processors which may or may not operate in parallel.

The network 150 may be any public network, such as the Internet, or any private network connected through one or more routers. For example, the network 150 may be a virtual private network operating over the Internet, a local area network, or a wide area network. Moreover, the network 150 may include any number of sub-networks or Autonomous Systems (AS). The network may operate according to any of a number of different protocols, such as Dynamic Address Routing (DART), Location-Aided Routing (LAR) protocol, Constrained Shortest Path First (CSPF), etc.

Although only end-users 160-166 are depicted in FIG. 1, it should be appreciated that a large number of connected computers may be included. End user computer 160-166 may be general purpose computers having all the internal components normally found in a personal computer such as, a central processing unit (CPU), display, CD-ROM, hard-drive, mouse, keyboard, modem, etc. For example, end user computers 160-166 may communicate over the network 150 via a modem or some other communication component such as a network card. End user computers 160-166 may comprise any device capable of processing instructions and transmitting data to and from humans and other computers, including network computers lacking local storage capability, PDA's with modems and Internet-capable wireless phones.

The server 180 may similarly be any device capable of processing instructions and transmitting data to and from other computers. For example, the server 180 may be a general purpose computer or any type of conventional server, such as a web server or a groupware server.

Figure 2:
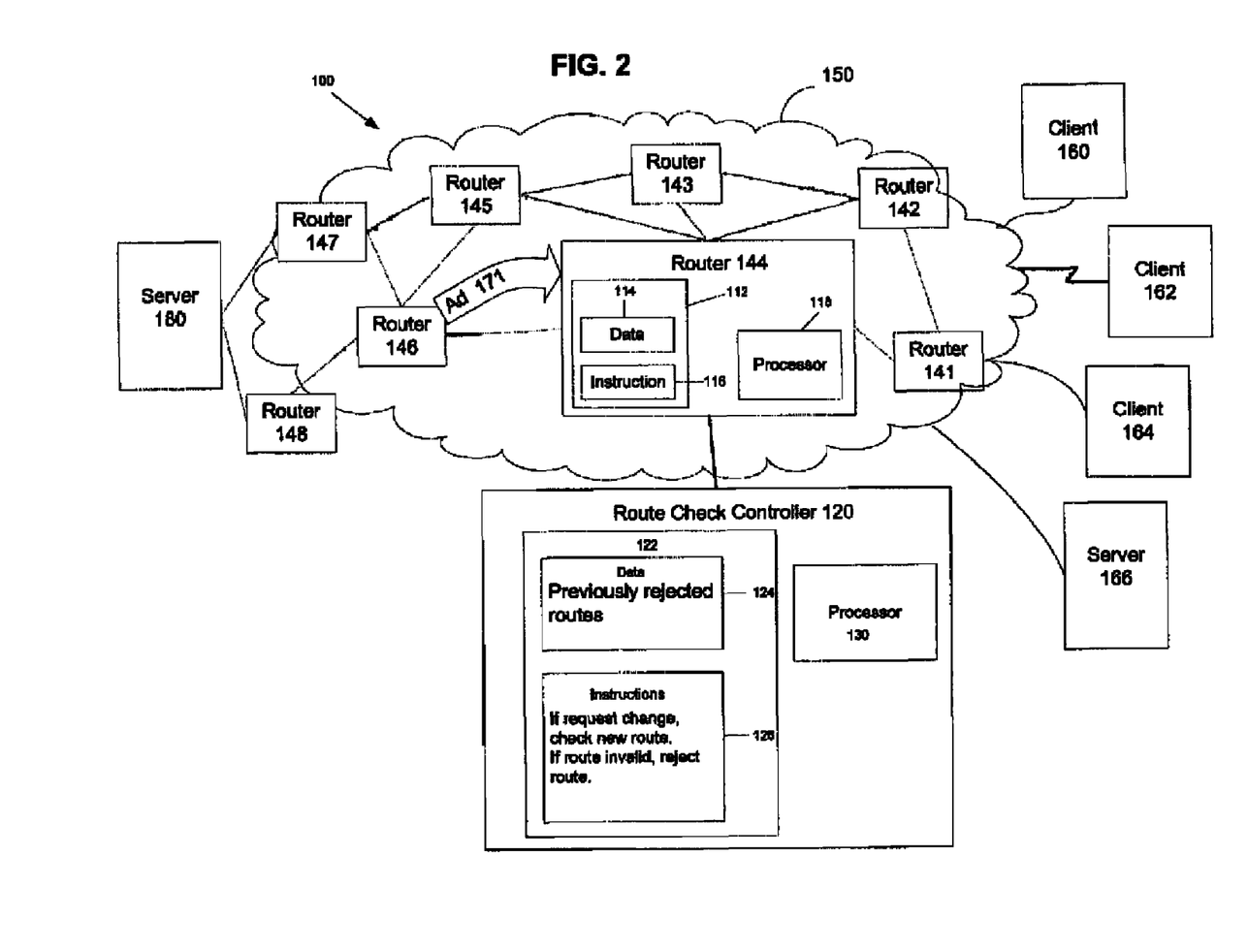
FIG. 2 is a system diagram according to another aspect of the invention.

In communicating with one another, routers 141-148 may exchange not only data packets between end-user computers 160-166 and a server 180, but they may also exchange route information. For example, according to BGP, routes advertised to a router by its peers may be stored in an Adj-RIB-In database. These routes may then be filtered by the router according to a predetermined policy, and the "best" of the filtered routes may be selected. The "best" route may be the route with the highest preference, the shortest AS path, or any other type of route depending on the router's policy. For example, as shown in FIG. 2, the router 146 advertises route information 171 to at least the router 144. This routing information 171 may include, for example, an indication that data packets may be quickly transmitted to the server 180 through the routers 145 and 147. If this route is shorter than a route currently used by the router 144, or if the advertising router 146 is a trusted source, the router 144 may consider adopting the advertised route 171 for data transmission.

The route check controller 120 may improve the exchange of information over networks. For example, with respect to the example discussed above, the route check controller 120 may verify that the routing information 171 considered for adoption by the router 144 will deliver transmitted packets to an intended destination.

In addition to the operations illustrated in FIGS. 1-4, an operation in accordance with a variety of aspects of the method will now be described. It should be understood that the following operations do not have to be performed in the precise order described below. Rather, various steps can be handled in reverse order or simultaneously.

Figure 5:
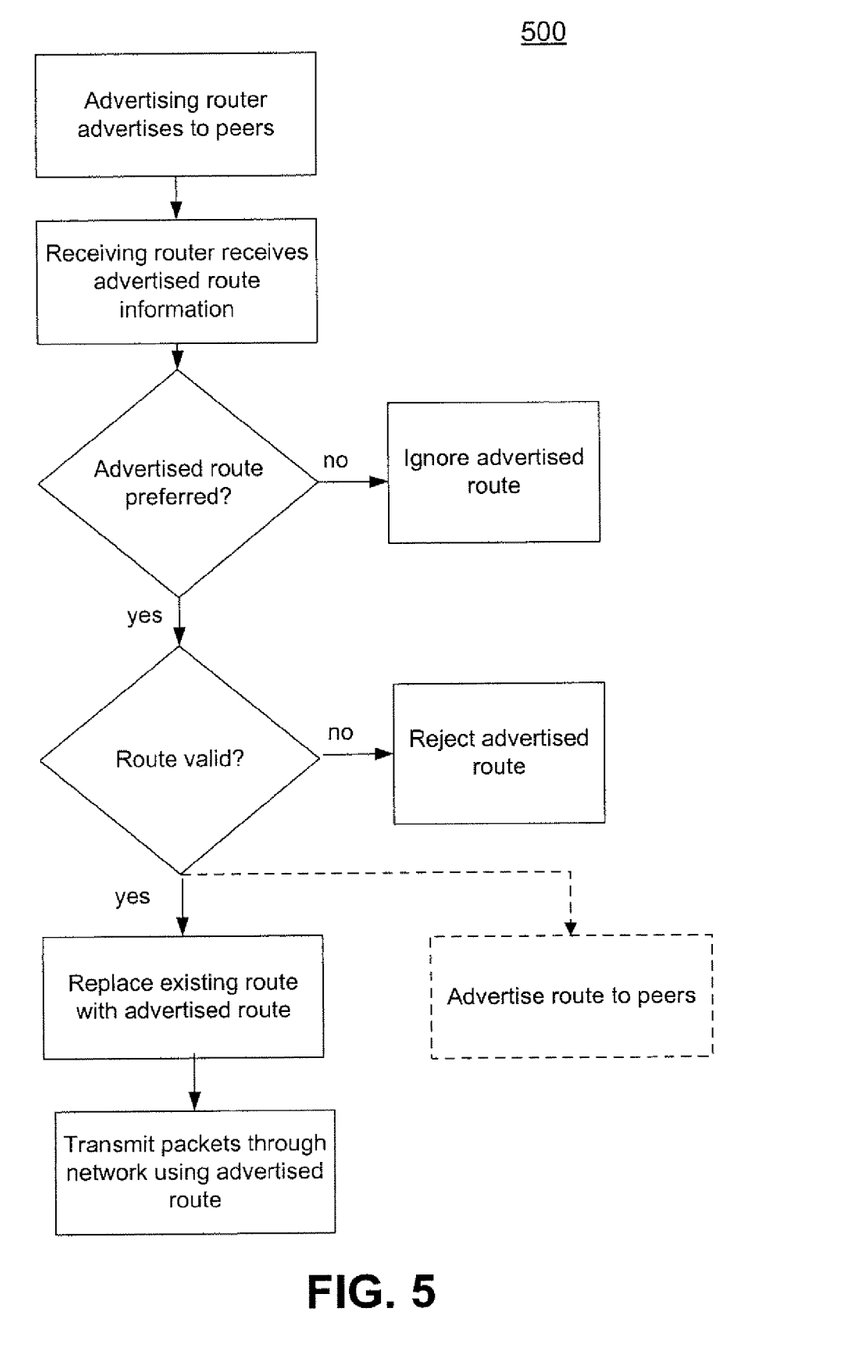
FIG. 5 is a flow diagram according to an aspect of the invention.

A method 500 of improving network routing is shown in FIG. 5. According to the method 500, a router receiving route information from its peer determines whether to adopt the routing information. Part of this decision includes a verification of whether the route is valid, e.g., whether packets transmitted via the route will reach a target destination. While the steps of method 500 are explained in a particular order below, it should be understood that additional steps may also be performed and that steps may be performed out of order.

An advertising router, e.g., router 146, advertises route information 171 to peer routers. The peer routers may include any routers in communication with the advertising router 146. The advertised routing information 171 may include, for example, an identification of one or more hops, or a specific route for reaching a destination from the router. The advertised routing information 171 may also include information such as the speed at which data may be transmitted via the routing information, and an identification of the advertising router. For example, router 146 may advertise that it can quickly access server 180.

A receiving router, e.g., router 144, receives the route information advertised by the advertising router 146. Depending on the number of neighboring routers, the router may receive a multitude of import routes at any given time. Each router in a network may have a predetermined protocol for handling such received routes. Accordingly, the receiving router may begin the predetermined protocol upon receipt. For example, the router 144 may store the routing information 171 in a particular database, such as an Adj-RIB-In database according to BGP. The database may be structured in a memory of the router or in an external device operating in conjunction with the router.

According to the present example, the predetermined protocol executed by the receiving router upon receipt of an advertised route 171 includes determining whether or not to adopt the advertised route 171 in place of route information already in use. In other words, the receiving router determines whether the received route is preferred over an existing route. This determination may be based on the source of the advertised route (e.g., all route information from a particular router is automatically preferred), characteristics of the received route (e.g., routes with shorter paths than those of existing routes preferred), or other network policy. For example, router 146 may advertise a route that appears to reach server 180 faster than sending data through the router 146. In that regard, router 146 may advertise data identifying a path and a time such as "router 145 to router 147 to server 180, average time of 0.5 seconds". Router 144 compares this route with the current preferred route to server 180 that is stored in its Loc-RIB database, or other database storing routing information used for actual data transmission. Such current preferred route may be, for example, "router 146 to router 146 to server 180, average time of 0.9 seconds". Because the newly advertised route is faster, router 144 may determine that the newly advertised route is preferred.

If the receiving router 144 determines that the advertised route is not preferred, the route is ignored.

However, if the receiving router 144 determines that the advertised route is preferred to the existing route, a controller, such as the route check controller 120, will verify the route.

Figure 3:
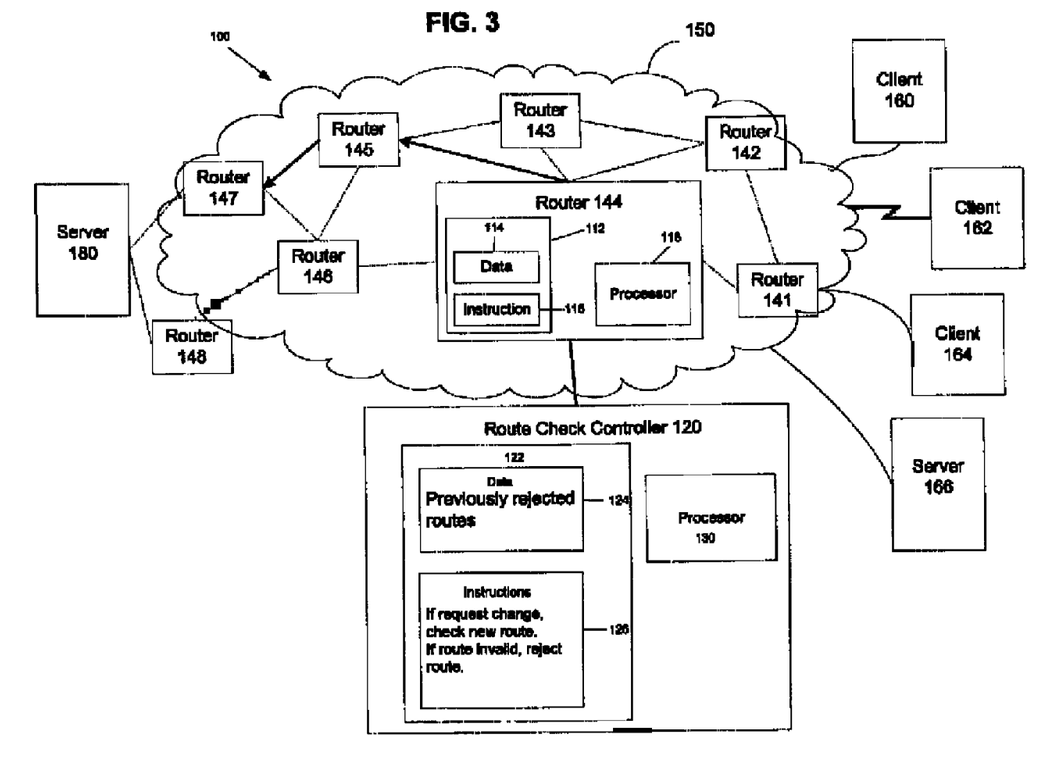
FIG. 3 is a system diagram according to another aspect of the invention.
Figure 4:
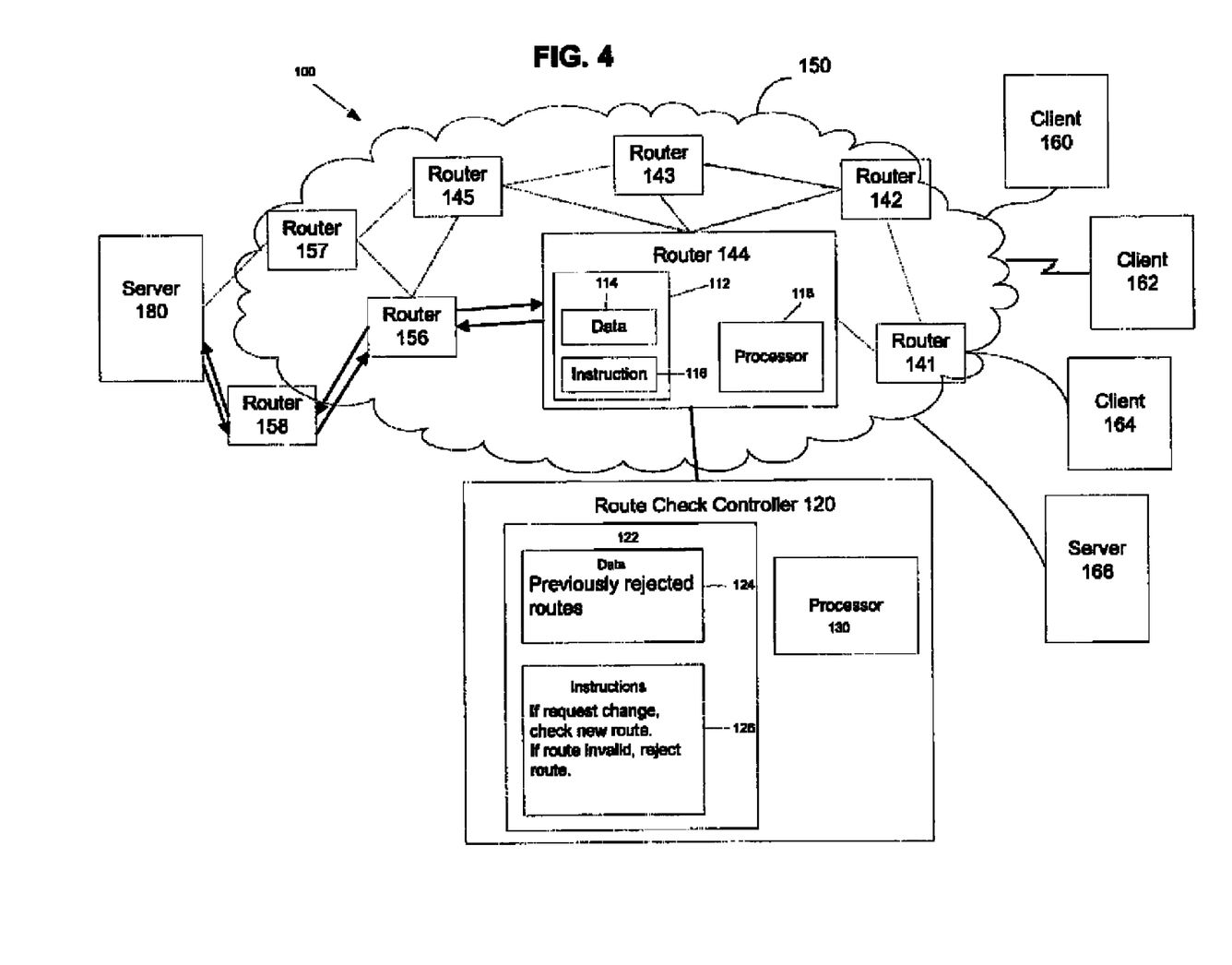
FIG. 4 is a system diagram according to another aspect of the invention.

Verification may be performed in any of a number of ways. For example, the received route may be traced to identify each hop along the route, and to ensure that packets transmitted through the route will reach the proper destination. Alternatively, as shown in FIG. 3, the receiving router 144 may transmit a sample packet through the received route and determine if the sample packet reached its destination. For example, the sample packet may include a request for response by the destination, and the receiving router may await receipt of the response packet to determine that the route is valid. In that regard and continuing the foregoing example, before adopting the advertised route 171 to server 180 (through routers 145 and 147), router 144 may ping server 180 through router 145.

Further examples of route verification may include general identity verification using a public-key infrastructure. That is, a verification request may be encrypted in the destination's public key and sent to the destination. The public key may be statically available, or may be obtained dynamically, for example, by deploying an out-of-band signaling network. The destination may decrypt the request using its private key, and send the decrypted request back as a response. Further, the import route selection and verification process may be performed by a peer or router itself, or by a separate unit in communication with therewith, such as a route check control unit. Alternatively, the selection and verification process may be performed as part of a BGP task/process itself.

If the route check controller 120 determines that the advertised route is invalid, that route will be rejected. This may be performed automatically, for example, using a route filtering rule. A rejected route will not be considered as a route for transmitting packets, and also will not be advertised as a potential route to other routers. For example, and with regard to FIG. 3, the router 144 may determine that the sample packet transmitted through routers 145 and 147 was never received by the server 180 (e.g., if the ping was never returned). Accordingly, the router 144 will reject this route. According to one example, the route check controller may separately store the rejected route for future reference. For example, when the receiving router receives an advertised route, the route check controller may compare the advertised route to its database of stored invalid route. If the advertised route is already in the database, and thus has already been determined to be invalid, the route may be rejected without re-verification.

If the route check controller 120 determines that the advertised route is valid, the receiving router 144 will replace the route currently in use and will transmit packets through the network using the advertised route. For example, if router 144 pinged server 180 and the ping was returned within a time frame similar to the expected time frame, router 144 may replace its currently listed route to 180 in its Loc-RIB database with the new route, namely, "router 146 to router 148 to server 180, average time of 0.5 seconds".

If the advertised router is valid, the receiving router 144 may optionally advertise this route to its peers. For example, the router 144 may add the route 171 to its Adj-RIB-Out database for sharing with its peers 141-143 and 145-148.

It should be understood that the advertised routes which are determined to be valid may still be filtered according to a specified import policy. Such policy may be unique to each router, and may implement any type of algorithm. For example, an import policy may be set to accept route information from only specified peers, or to accept only a limited amount of route information. Moreover, in a scenario where multiple routes to a destination (e.g., server 180) are determined to be valid and pass the filtering policy, a preferred route of the filtered routes may be selected for transmission of the packet. Such selection may be performed according to a predetermined algorithm set for each router. For example, the validated route may be compared to one or more routes currently in use by the router for reaching a particular destination. The preferred route may be determined based on, for example, a local preference attribute, weight, or AS path (i.e., the hops between the router and the destination). Once the preferred route is selected, it may be added to a Loc-RIB database for use in routing packets.

It should also be understood that with regard to advertising the route to further routers, such route may be filtered using a predetermined export policy specified for that router. In other words, the router 144 may determine which routes are appropriate for advertisement to its peers 141-143 and 145-148. The routes that survive the export policy filtering are added to an Adj-RIB-Out database for that router for sharing with peer routers.

Although in the above described method, routes are verified if they are determined to be preferred to existing routes, another aspect provides that routes may be selected from a database for verification. Selection may be performed according to any of a number of different predetermined criteria. For example, according to one aspect, all import routing information received by the router may be retrieved for verification. However, as this may result in a large number of routes to be verified, it may carry a consequence of slowing performance. Therefore, according to another aspect, only some import routes will be selected. For example, routes may be selected at random or routes for representative or well-known IP addresses may be selected.

According to one aspect, the route check controller 120 may alternatively or additionally retrieve routes already in use by the router 144 and verify such routes before any further packets are transmitted via the retrieved route. According to another aspect, where multiple routers exchange route information, route information received by a router may be verified prior to use and/or advertisement to neighboring routers. This process may be executed by each router 141-148 for maximum security, or by select routers in a network. For example, it should be understood that the route check controller 120 or further similar devices may be coupled to the remaining routers 141-143 and 145-148.

Additionally, the steps of the method 500 may be performed automatically, manually, or some combination thereof. For example, a route check controller may select particular import routes according to a predetermined algorithm, but an operator may manually retrieve additional import routes for verification as necessary or desired.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting data via a network of computers, the method comprising:
   receiving, at a first node of the network and from a second node of the network, first suggested routing information to a destination node, where the first suggested routing information defines at least one node through which data will be transmitted to the destination node;
   sending a sample packet to the destination node via the first suggested routing information;
   determining, with a processor associated with the first node, whether the sample packet was received at the destination node;
   receiving, at the first node of the network, data from a node of the network, where the data is intended to be sent to the destination node;
   sending the data to the destination via the first suggested routing information if the sample packet was received at the destination; and
   automatically rejecting the first suggested routing information if the sample packet was not received at the destination.

2. The method of claim 1 further comprising:
   determining whether the first suggested routing information is preferable to second routing information, where the second routing information defines at least one different node through which data will be transmitted to the destination node;
   sending the data to the destination via the first suggested routing information depending on the determination of whether the sample packet was received at the destination and also depending on whether the first suggested routing information is preferable to the second suggested routing information.

3. The method of claim 2 wherein the first suggested route is preferable to the second suggested route if the estimated time of transmitting the data via the first suggested route is faster than transmitting the data via the second route.

4. The method of claim 2 wherein the second routing information was, prior to receiving the first suggested route, stored in a memory accessible by the processor associated with the first node.

5. The method of claim 1 further comprising:
   determining whether the first suggested routing information is preferable to second routing information, where the second routing information defines at least one different node through which data will be transmitted to the destination node;

sending the sample packet to the destination via the first suggested routing information depending on the determination of whether the first suggested routing information is preferable to the second suggested routing information.

6. The method of claim 1 wherein the first suggested routing information is received in accordance with border gateway protocol.

7. The method of claim 1, wherein the step of determining whether the sample packet was received at the destination node includes determining whether a response packet from the destination was received.

8. The method of claim 1, wherein the sample packet is encrypted using a public key of the destination node.

9. The method of claim 1, wherein the first suggested routing information is stored in a memory of the first node and selected for sending the sample packet at random.

10. The method of claim 1, further comprising advertising the selected route to peers if it is determined that the sample packet was received at the destination node.

11. A system of routing information comprising:
a network of nodes including a first node;
a first router in communication with a second router, a third router, and the first node;
the first router comprising a processor, instructions executable by the processor, and a memory storing preferred routing information, the preferred routing information including first routing information for transmitting data to the first node;
the second router comprising a memory storing second routing information for transmitting data to the first node;
the instructions comprising:
receiving, at the first router, the second routing information,
transmitting a sample data packet to the first node via the second routing information,
determining whether the sample data packet was received at the first node,
storing, as the preferred routing information, the second routing information if the sample packet was received at the first node, and
automatically rejecting the second routing information if the sample packet was not received at the first node.

12. The system of claim 11 wherein the network of nodes is the Internet.

13. The system of claim 11 wherein the routing information identifies a plurality of routers.

14. The system of claim 11 wherein the routing information identifies a plurality of nodes that may be accessed via the identified router.

15. A controller communicable with a router for use in routing information through a network, the controller comprising:
a processor;
instructions executable by the processor; and
a memory storing routes which are known to be valid or invalid;
the instructions comprising:
receiving routing information stored in a database of the router;
comparing the routing information with the routes known to be valid or invalid;
deleting the routing information from the first database of the router if the routing information matches routing information known to be invalid;
if the routing information does not match routing information known to be valid or invalid, determining whether packets transmitted via the routing information will reach an intended destination; and
transmitting to the router data indicating that the routing information is valid if it is determined that packets transmitted via the routing information will reach the intended destination.

16. The system of claim 15, wherein the controller is integrated in the router.

17. The system of claim 15, wherein the receiving routing information is performed based on a number of times the routing information is used by the router to transmit packets through the network.

18. The system of claim 15, wherein the receiving routing information is performed based on the intended destination.

19. A non-transitory computer-readable medium executable on a computing device and storing a program to perform a method of transmitting data through a network, the method comprising:
receiving, at a first node of the network and from a second node of the network, first suggested routing information to a destination node, where the first suggested routing information defines at least one node through which data will be transmitted to the destination node;
sending a sample packet to the destination node via the first suggested route;
determining, with a processor associated with the first node, whether the sample packet was received at the destination node;
receiving, at the first node of the network, data from a node of the network, where the data is intended to be sent to the destination node;
sending the data to the destination via the first suggested route depending on the determination of whether the sample packet was received at the destination; and
automatically rejecting the first suggested routing information if the sample packet was not received at the destination.

* * * * *